(12) United States Patent
Chen (10) Patent No.: US 11,541,528 B2
(45) Date of Patent: Jan. 3, 2023

(54) HANDHELD IMPLEMENT WITH REPLACEABLE WORK TOOL

(71) Applicant: YUYAO DARDON GARDEN TOOLS FACTORY, Zhejiang (CN)

(72) Inventor: Weidong Chen, Zhejiang (CN)

( * ) Notice: Subject to any disclaimer, the term of this patent is extended or adjusted under 35 U.S.C. 154(b) by 0 days.

(21) Appl. No.: 17/162,599

(22) Filed: Jan. 29, 2021

(65) Prior Publication Data

US 2022/0203515 A1     Jun. 30, 2022

(30) Foreign Application Priority Data

Dec. 29, 2020    (CN) .......................... 202023254016.5

(51) Int. Cl.
    *B25G 3/12*        (2006.01)
    *A01B 1/22*        (2006.01)

(52) U.S. Cl.
    CPC . *B25G 3/12* (2013.01); *A01B 1/22* (2013.01)

(58) Field of Classification Search
    CPC ... B25G 3/12; B25G 3/18; B25G 3/20; B25G 3/24; B25G 3/28; B25G 1/04; B25G 1/043; B25G 1/046; A01B 1/22; A01B 1/227

See application file for complete search history.

(56) References Cited

U.S. PATENT DOCUMENTS

| | | | | |
|---|---|---|---|---|
| 478,556 A | * | 7/1892 | Bettmann | ................. E05C 1/14 292/170 |
| 3,545,799 A | * | 12/1970 | Abraham | .............. E05B 63/122 292/34 |
| 5,454,165 A | * | 10/1995 | Thompson | ............... B25G 3/28 30/249 |
| 5,477,929 A | * | 12/1995 | Kenyon | .................... A01B 1/22 172/371 |
| 5,774,994 A | * | 7/1998 | Stein | .................... A47J 37/0786 294/7 |
| 5,836,223 A | * | 11/1998 | Lin | ..................... B25B 23/0021 81/436 |
| 5,911,798 A | * | 6/1999 | Arnold | .................. B25B 13/461 81/177.2 |
| 5,975,592 A | * | 11/1999 | Lin | .......................... B25G 3/18 292/159 |
| 6,367,125 B1 | * | 4/2002 | Lin | ........................ B25G 1/063 16/436 |
| 6,378,400 B1 | * | 4/2002 | Bogli | .................... B25B 13/461 81/177.2 |
| 6,386,070 B1 | * | 5/2002 | Hong | ....................... B25G 3/18 16/110.1 |

(Continued)

*Primary Examiner* — Jeffrey O'Brien
(74) *Attorney, Agent, or Firm* — Rumit Ranjit Kanakia (57) ABSTRACT

A handheld implement with a replaceable work tool includes a handle body which is equipped with a locking device for detachably mounting the work tool. The locking device includes a movable member, at least one retaining member and a first spring. The first spring abuts against the retaining member so that the retaining member is inserted into a locking hole of the work tool while remaining in an extended state. The retaining member includes a first mating body including at least one second mating body. The second mating body includes a mating portion, and the movable member performs translational movement so that the mating portion and the first mating body cooperate with each other to drive the retaining member to retreat and then withdraw from the locking hole of the work tool.

10 Claims, 12 Drawing Sheets

(56) References Cited

U.S. PATENT DOCUMENTS

| | | | | |
|---|---|---|---|---|
| 6,543,958 B2 * | 4/2003 | Huang | A01B 1/222 | 30/329 |
| 6,619,408 B1 * | 9/2003 | Lai | B25G 1/01 | 16/110.1 |
| 7,555,804 B2 * | 7/2009 | Lin | A47L 13/144 | 15/116.2 |
| 7,555,805 B2 * | 7/2009 | Lin | A47L 13/144 | 15/116.2 |
| 7,653,970 B1 * | 2/2010 | Lai | B25G 3/12 | 16/422 |
| 8,033,582 B2 * | 10/2011 | Sawatani | E05B 83/30 | 292/33 |
| 8,191,267 B2 * | 6/2012 | Patel | E04F 21/165 | 30/339 |
| 8,684,620 B2 * | 4/2014 | Lin | F16B 7/105 | 403/109.7 |
| 9,346,077 B2 * | 5/2016 | Lambertson, Jr. | B05C 17/0205 | |
| 10,478,949 B2 * | 11/2019 | White, II | B25B 23/16 | |
| 10,589,415 B2 * | 3/2020 | Cafasso | A47L 7/0066 | |
| 10,843,325 B2 * | 11/2020 | Scheuber | A61B 17/162 | |
| 10,913,144 B1 * | 2/2021 | Whicker | B25G 3/26 | |
| 2002/0073554 A1 * | 6/2002 | Chen | B25G 3/18 | 30/169 |
| 2003/0024066 A1 * | 2/2003 | Kennedy | A47L 13/42 | 15/322 |
| 2003/0024126 A1 * | 2/2003 | Liu | A47J 43/283 | 30/340 |
| 2007/0017072 A1 * | 1/2007 | Serio | B25G 3/18 | 24/573.11 |
| 2007/0240268 A1 * | 10/2007 | Le | A47L 13/20 | 15/98 |
| 2007/0240545 A1 * | 10/2007 | Lin | B25B 23/0021 | 81/177.2 |
| 2010/0147117 A1 * | 6/2010 | Hsieh | B25B 23/0021 | 81/177.85 |
| 2010/0263219 A1 * | 10/2010 | Kempker | B25F 1/02 | 30/337 |
| 2014/0197609 A1 * | 7/2014 | Chen | B25G 3/18 | 279/97 |
| 2015/0209944 A1 * | 7/2015 | Cho | B25B 23/0042 | 81/60 |
| 2019/0299391 A1 * | 10/2019 | Hu | B25B 15/00 | |
| 2020/0338702 A1 * | 10/2020 | Lee, IV | B25G 1/085 | |
| 2020/0391371 A1 * | 12/2020 | Nelson | A01D 7/02 | |

* cited by examiner

HANDHELD IMPLEMENT WITH REPLACEABLE WORK TOOL

FIELD OF THE INVENTION

The invention relates to the technical field of agricultural or garden tools, and particularly to a handheld implement with a replaceable work tool.

BACKGROUND OF THE INVENTION

Currently, many garden tools or agricultural implements with work tools are carried in agricultural or gardening work, which makes it quite inconvenient to go out therewith. Therefore, a garden tool or an agricultural implement with a replaceable work tool has been developed. Accordingly, it is only necessary to go out with a handheld implement and a work tool box (with multiple work tools stored inside) that matches the handheld implement, thereby improving the convenience in soil work. However, garden tools or agricultural implements with replaceable work tools existing on the market in the prior art have replacement structures in which the work tools are detachably mounted on the handheld implements by means of bolts or clamps, etc., but such mode makes it quite inconvenient to replace and use the work tools due to frequent replacement of the work tools, which further affects the operating efficiency of agricultural or gardening work.

SUMMARY OF THE INVENTION

An object of the invention is to provide a handheld implement with a replaceable work tool which allows convenient replacement of agricultural or gardening work tools and improves the operating efficiency of work so as to solve the disadvantages of the above art.

The handheld implement with a replaceable work tool provided by the invention includes a handle body which is equipped with a locking device for detachably mounting the work tool; wherein the locking device including a movable member, a first retaining member, a second retaining member and a first spring, two ends of the first spring respectively abutting against the first retaining member and the second retaining member so that the two retaining members are inserted into a locking hole of the work tool while remaining in an extended state, the first retaining member and the second retaining member both including a first mating body, the movable member including a second mating body and a third mating body, the second mating body including a first mating portion, the third mating body including a second mating portion, and when the movable member moves upward or downward during translational movement, the first mating portion and the first mating body cooperate with each other to make the first retaining member move and the second mating portion and the first mating body cooperate with each to make the second retaining member move, so as to drive the first retaining member and the second retaining member to retreat and then to withdraw from the locking hole of the work tool.

Preferably, the locking device further includes a fixed member fixed on the handle body, the fixed member is provided with a first sliding track, and the first retaining member the second retaining member are both placed in the first sliding track.

Preferably, the locking device further includes a second spring, both ends of which are respectively connected with the fixed member and the movable member.

Preferably, an end of the first sliding track is closed to form a first closed end and a second closed end, a first perforation is arranged at the first closed end of the first sliding track, a second perforation is arranged at the second closed end of the first sliding track, the first retaining member includes a first locking portion penetrating through the a first perforation, and the second retaining member further includes a second locking portion penetrating through the a second perforation.

Preferably, both the first mating portion and the second mating portion include an inclined surface or a circular arc surface.

Preferably, the fixed member is provided with a second sliding track, the second mating body and the first mating body are placed in the second sliding track, and outer walls of the second mating body and the third mating body tightly fit an inner wall of the second sliding track.

Preferably, the handle body is provided with an inner cavity in which the locking device is positioned, the movable member of the locking device is provided with a knob, a first elongated hole, a first through hole and a second through hole are arranged on an inner wall of the inner cavity, the knob penetrates through and extends out of the first elongated hole, and the first locking portion of the first retaining member penetrates through the first perforation and the first through hole, while the second locking portion of the second retaining member penetrates through the second perforation and the second through hole.

Preferably, a positioning slot is arranged at an end of the handle body.

Preferably, the handheld implement with a replaceable work tool further includes a positioning sleeve fixedly inserted into a port of the handle body, and the positioning slot is arranged on an inner wall of the positioning sleeve.

Preferably, the fixed member includes a first spliced body and a second spliced body which are respectively provided with an elongated through hole and two through slots communicated with the elongated through hole, the two elongated through holes are correspondingly spliced to form the first sliding track, a first through slot of the first spliced body and a first through slot of the second spliced body are spliced with each other to form a first perforation, and the second through slot of the first spliced body and a second through slot of the second spliced body are spliced together to form a second perforation, and each of the first spliced body and the second spliced body is provided with the second sliding track.

Preferably, a shell sleeve is sleeved on the handle body, and provided with a second elongated hole positionally corresponding to the first elongated hole.

Preferably, both an end surface of the first locking portion of the first retaining member and an end surface of the second locking portion of the second retaining member are an inclined surface or a circular arc surface.

Preferably, a first limiting body is arranged at a bottom end of the second mating body that is located at the first mating portion, and a second limiting body is arranged at a bottom end of the third mating body that is located at the second mating portion.

For the handheld implement with a replaceable work tool provided by the invention, the translational movement of the movable member can drive the locking portion of the retaining member to retreat and then withdraw from the locking hole of the work tool so that the work tool can be disassembled, then the movable member is reset under the action of the second spring so that the first spring is stretched to keep the locking portion of the retaining member extended, then a sleeve body of the work tool is sleeved on the handle body to press the retaining member to retreat, and after the locking hole on the sleeve body corresponds to the retaining locking portion, the first spring is stretched to drive the retaining member to move outward so that the locking portion penetrates through the perforation and the through hole to be inserted into the locking hole for locking the work tool. The replacement mode thereof enables the work tool to be conveniently disassembled and mounted, provides a compact and reliable structure, improves the service performance and increases the operating efficiency of agricultural or gardening work.

DETAILED DESCRIPTION OF THE INVENTION

The technical solutions in the embodiments of the invention will be clearly and completely described below in conjunction with the drawings in the embodiments of the invention. It is apparent that the described embodiments are only part of rather than all of the embodiments in the invention. Based on the embodiments of the invention, all other embodiments obtained by those of ordinary skill in the art fall within the protection scope of the invention.

Embodiment 1

As shown in the Figures, a handheld implement with a replaceable work tool described in this embodiment includes a handle body 1 which is provided with an inner cavity 14, wherein a locking device 2 for detachably mounting the work tool is positioned in the inner cavity 14; the locking device 2 including a movable member 22, a first retaining member 21, a second retaining member 26 and a first spring 24, two ends of the first spring 24 respectively abutting against the first retaining member 21 and the second retaining member 26 so that the two retaining members are inserted into a locking hole of the work tool while remaining in an extended state, the first retaining member 21 and the second retaining member 26 both including a first mating body 213, the movable member 22 including a second mating body 221 and a third mating body 225, the second mating body 221 including a first mating portion 222, the third mating body 225 including a second mating portion 226, and when the movable member moves upward or downward during translational movement, the first mating portion 222 and the first mating body 213 cooperate with each other to make the first retaining member move and the second mating portion and the first mating body cooperate with each to make the second retaining member move, so as to drive the first retaining member and the second retaining member to retreat and then to withdraw from the locking hole of the work tool. The first mating portion 222 and second mating portion 226 both include an inclined surface or a circular arc surface, the first mating body 213 includes a cylinder, and the translation of the first retaining member 21 and the second retaining member 26 is more stable and reliable, so that the structure is more compact; the first retaining member 21 and the second retaing member slide in a limiting manner during translation; the locking device 2 further includes a fixed member 25 fixed on the handle body 1, the fixed member 25 is provided with a first sliding track 253, and the retaining member 21 and the second retaining member 26 are placed in the first sliding track 253; and an end of the first sliding track 253 is closed to form a first closed end and a second closed end, a first perforation 254 is arranged at the first closed end of the first sliding track 253, a second perforation 255 is arranged at the second closed end of the second sliding track 253, the first retaining member 21 includes a first locking portion 211 penetrating through the a first perforation 254, and the second retaining member 26 further includes a second locking portion 212 penetrating through the a second perforation 255. Therefore, the movable member moves upward during translational movement, so that the first mating body 213 of the first retaining member 21 and the first mating body 213 of the second retaining member 26 are driven to displace under the action of the inclined surfaces of the second mating body 226 and the third mating body 225 so as to pull the first retaining member 21 and the second retaining member 26 to retreat; and after the work tool 200 is completely disassembled, the movable member 22 moves down, and the first mating body 213 of the first retaining member 21 and the first mating body 213 of the second retaining member 26 move outward along the inclined surface under the action of the first spring 24, causing the first locking portion 211 of the first retaining member 21 to penetrate through the first perforation 254 and the through hole and the second locking portion 212 of the second retaining member 26 to penetrate through the second perforation 255 and another through hole; or the movable member 22 moves downward during translational movement, so that the first mating body 213 of the first retaining member 21 and the first mating body 213 of the second retaining member 26 are driven to displace under the action of the inclined surfaces of the second mating body 226 and the third mating body 225 so as to pull the first retaining member 21 and the second retaining member 26 to retreat; and after the work tool is completely disassembled, the movable member 22 moves up, and the first mating body 213 of the first retaining member 21 and the first mating body 213 of the second retaining member 26 move outward along the inclined surface under the action of the first spring 24, causing the first locking portion 211 of the first retaining member 21 to penetrate through the first perforation 254 and the through hole and the second locking portion 212 of the second retaining member 26 to penetrate through the second perforation 255 and another through hole.

Figure 1:
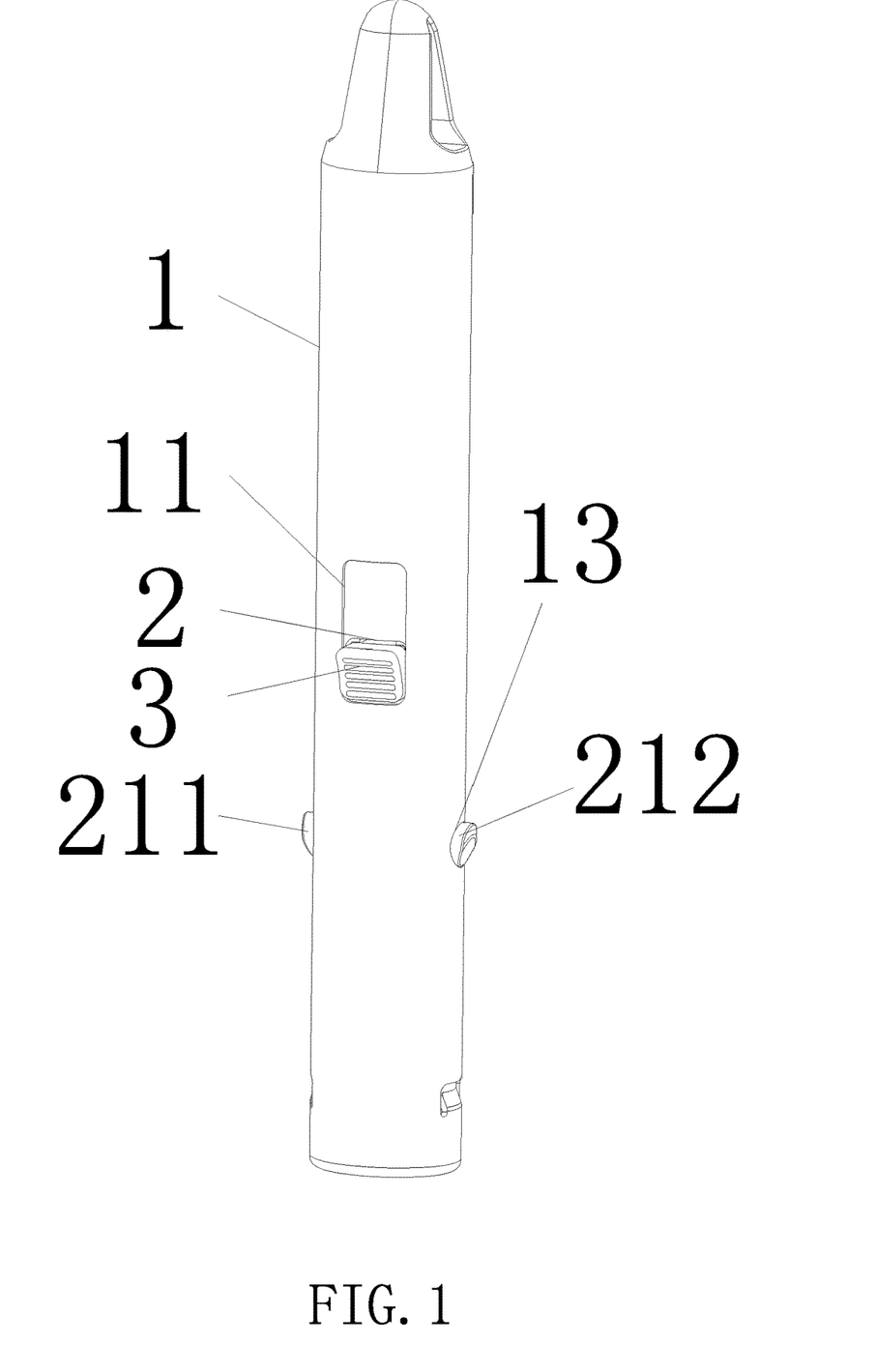
FIG. 1 is a first schematic view of the overall structure.
Figure 2:
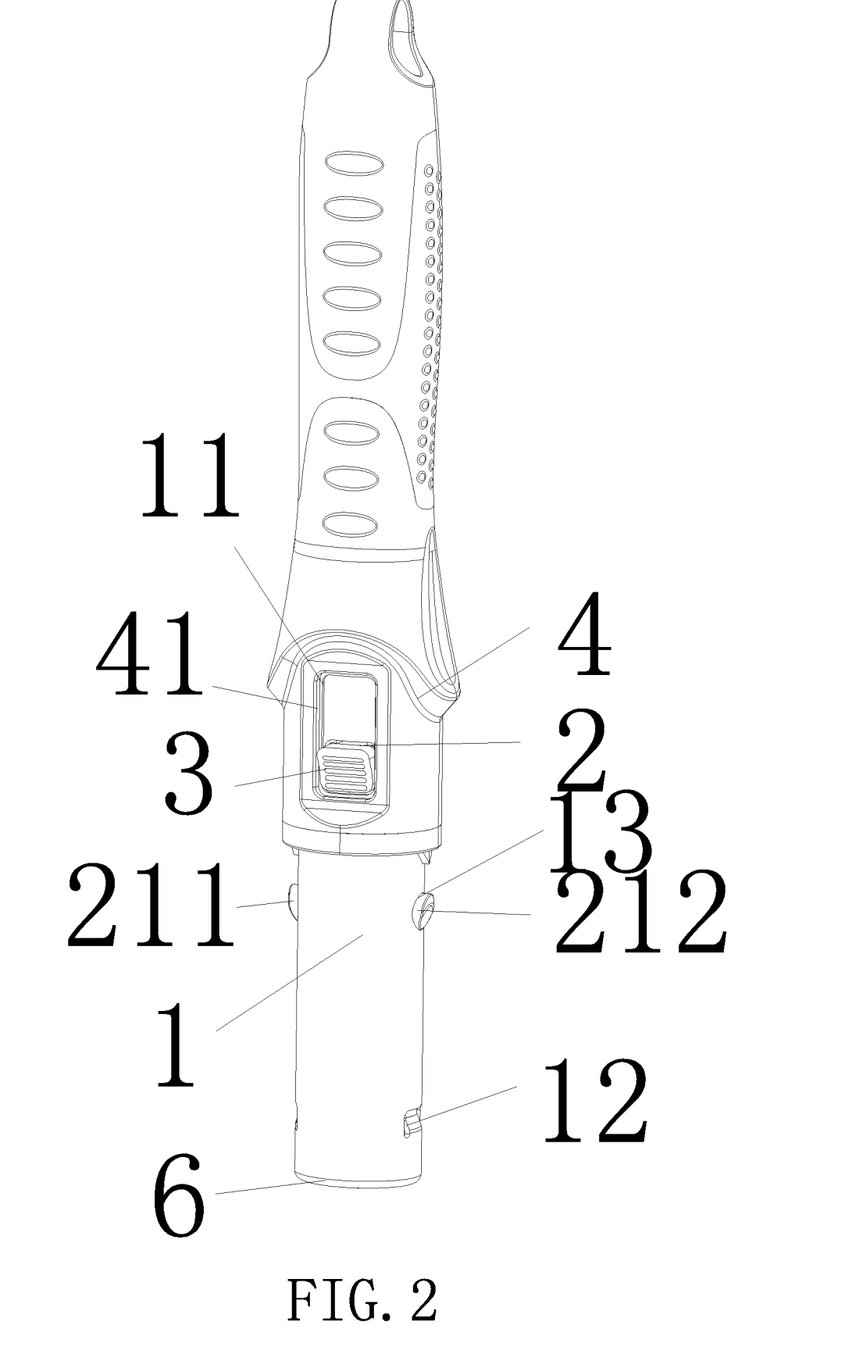
FIG. 2 is a second schematic view of the overall structure.
Figure 3:
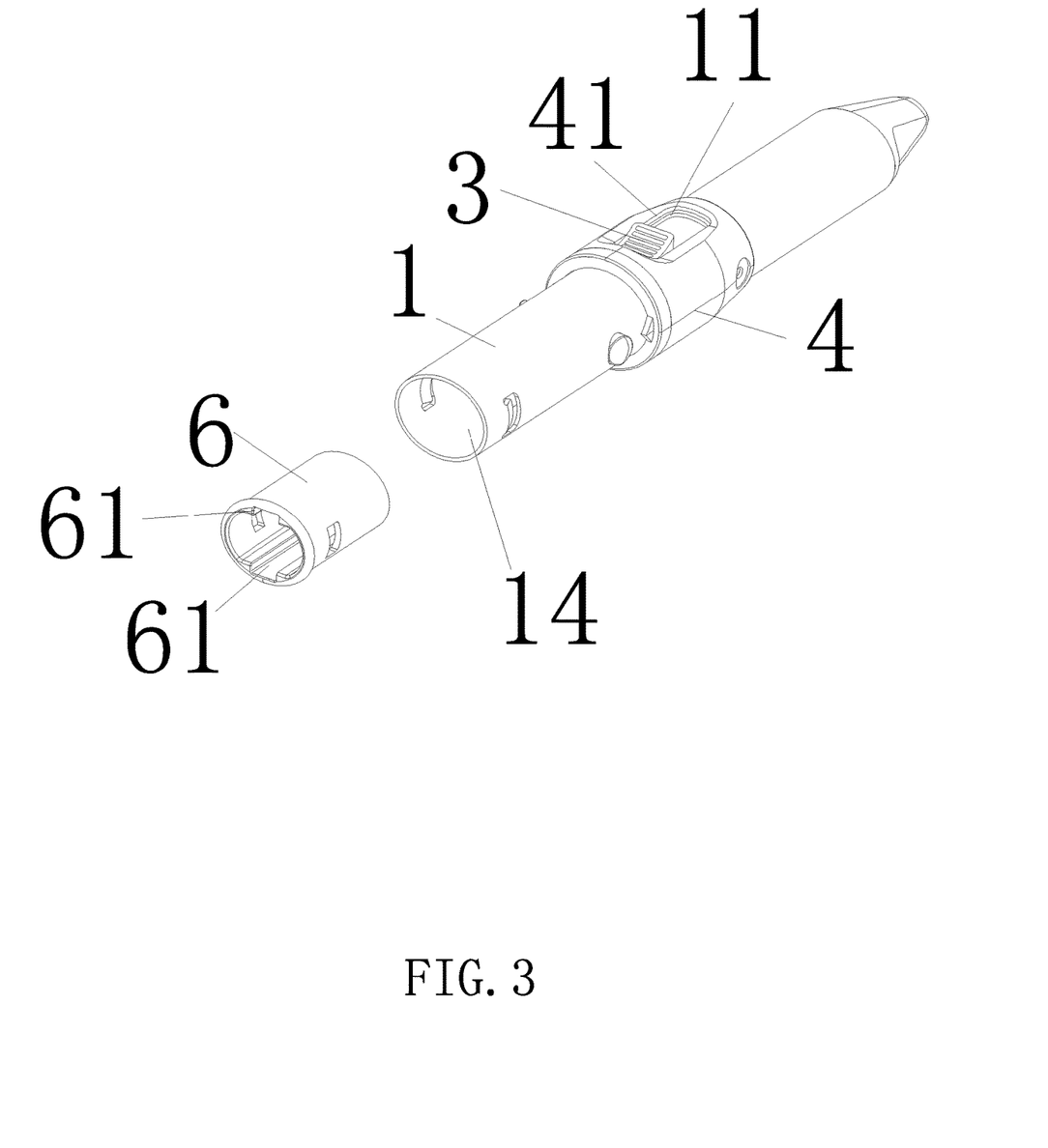
FIG. 3 is an exploded view of the overall structure.
Figure 4:
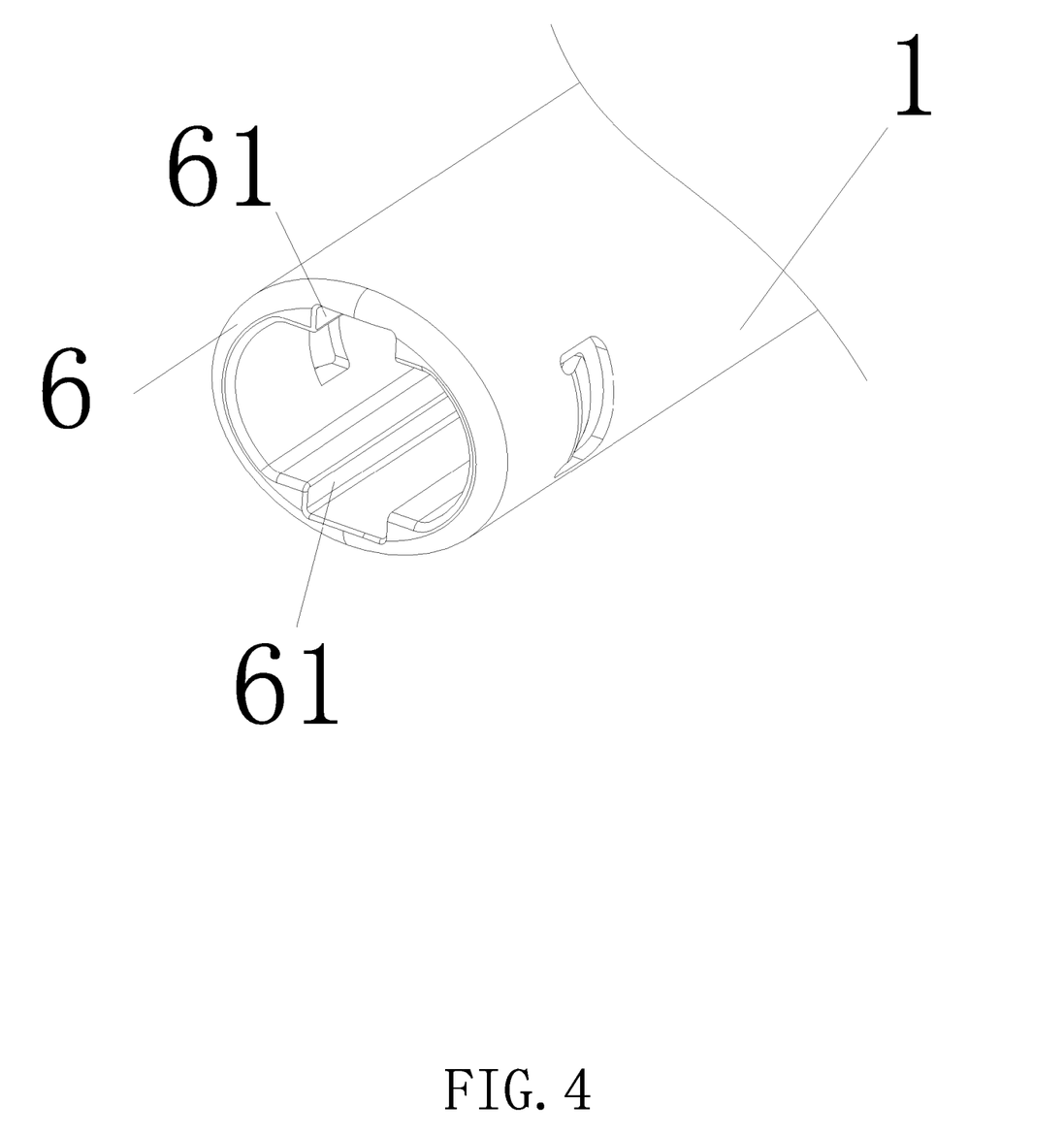
FIG. 4 is a partial view.
Figure 5:
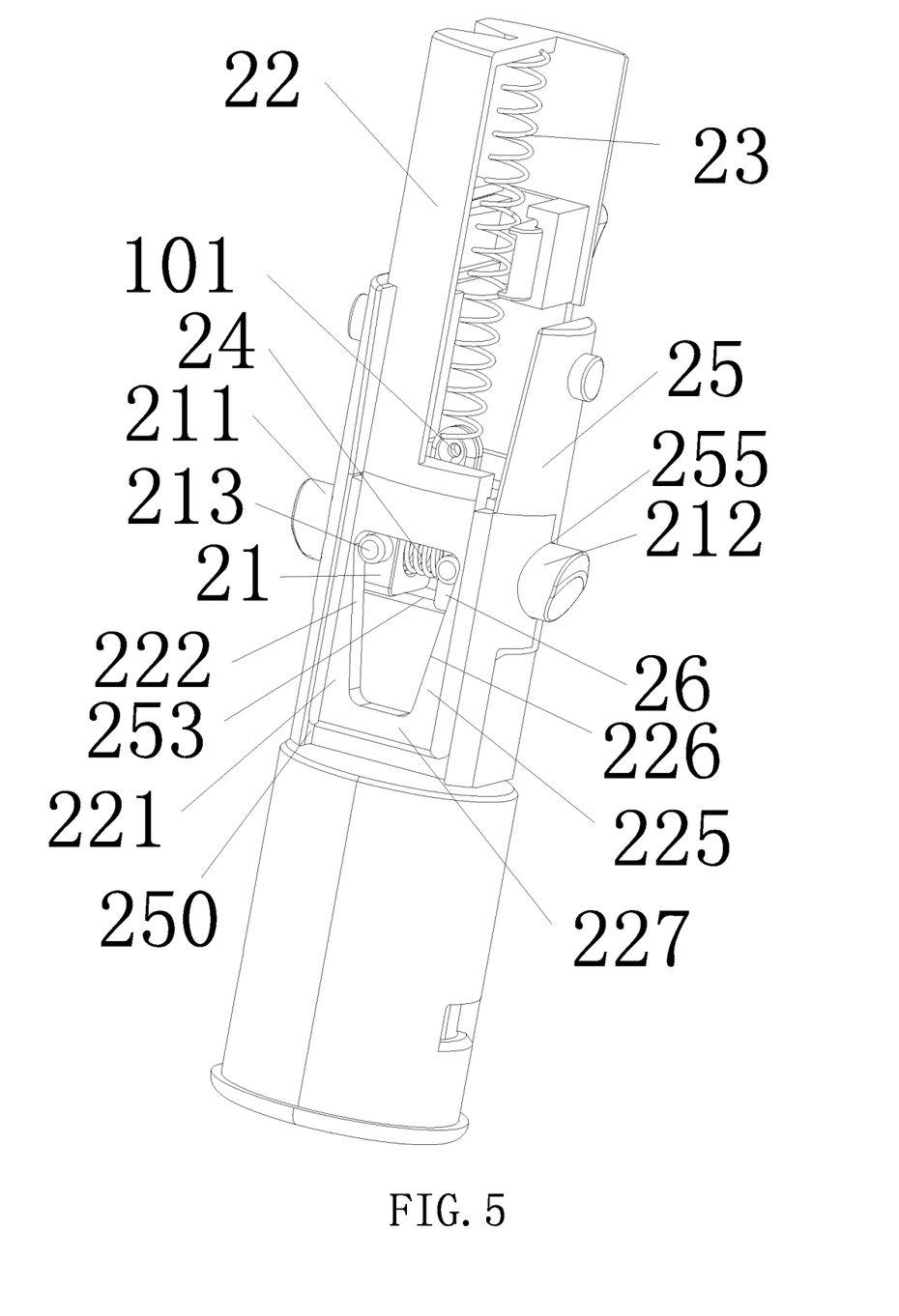
FIG. 5 is a first schematic structural view of a locking device.
Figure 6:
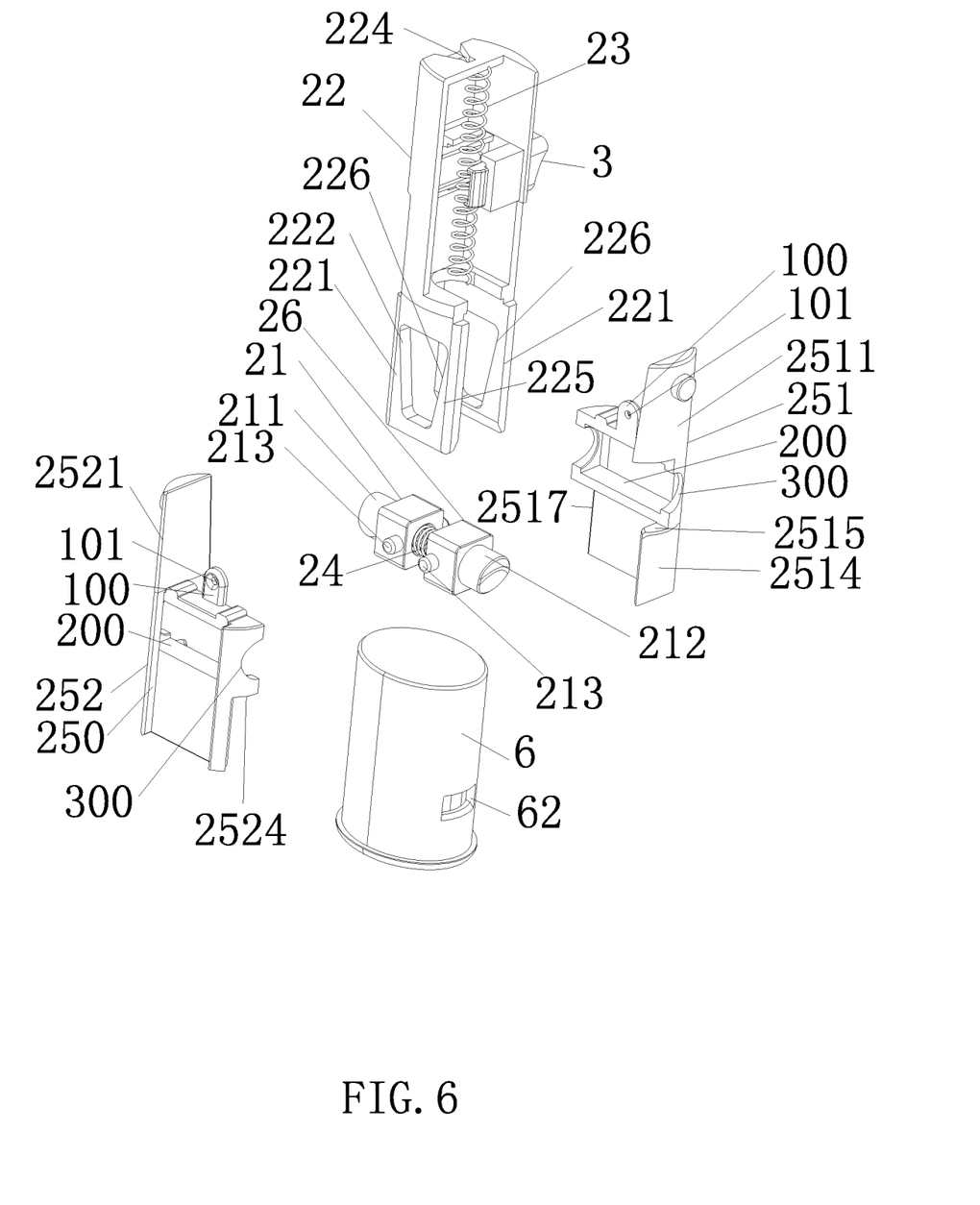
FIG. 6 is an exploded view of the structure of the locking device.
Figure 7:
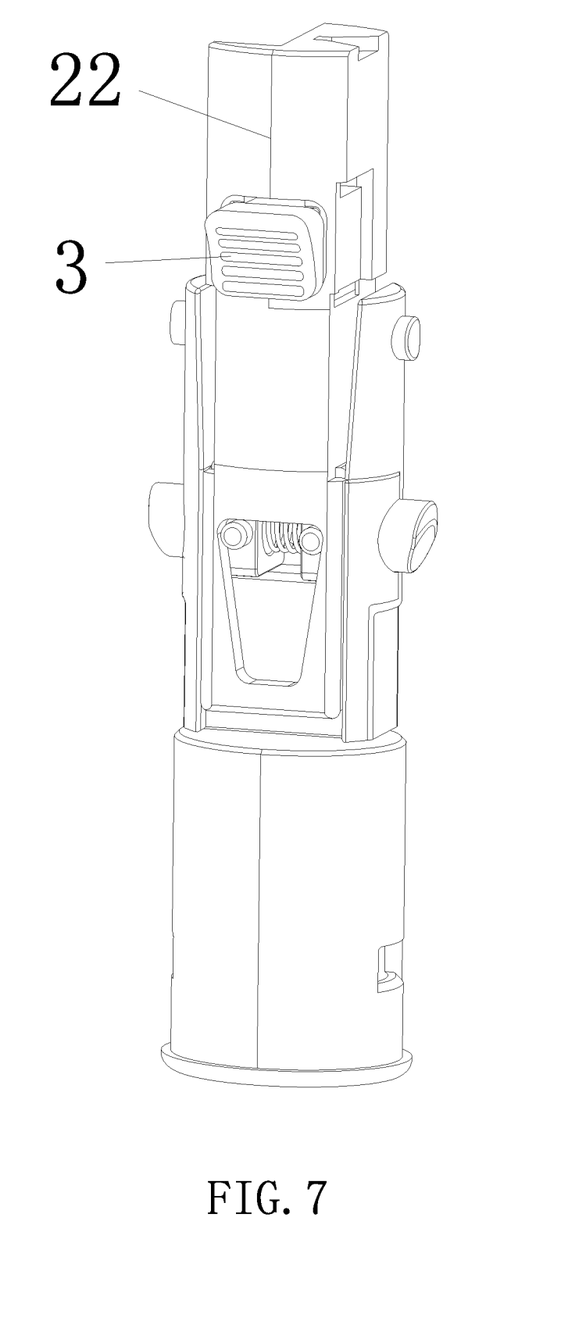
FIG. 7 is a second schematic structural view of the locking device.
Figure 8:
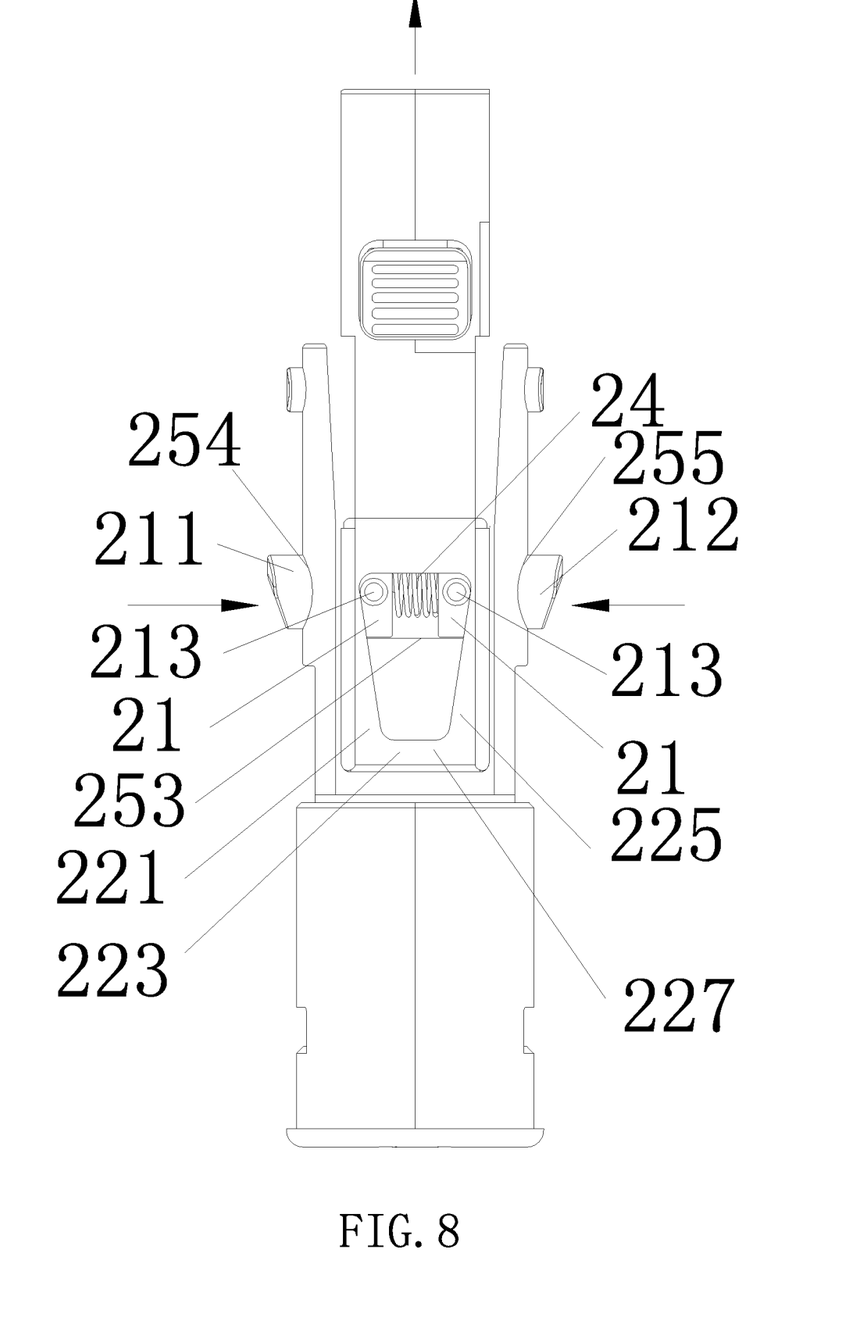
FIG. 8 is a first schematic view of a locking portion of the locking device in an extended state.
Figure 9:
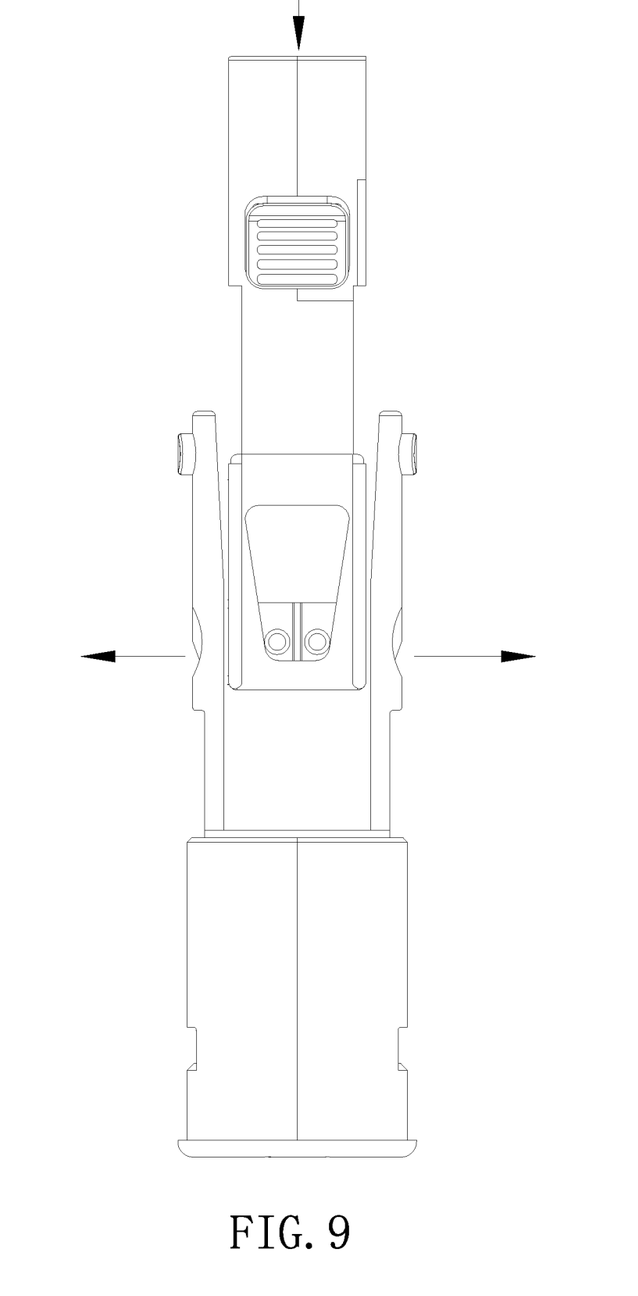
FIG. 9 is a first schematic view of the locking portion of the locking device in a retracted state.
Figure 10:
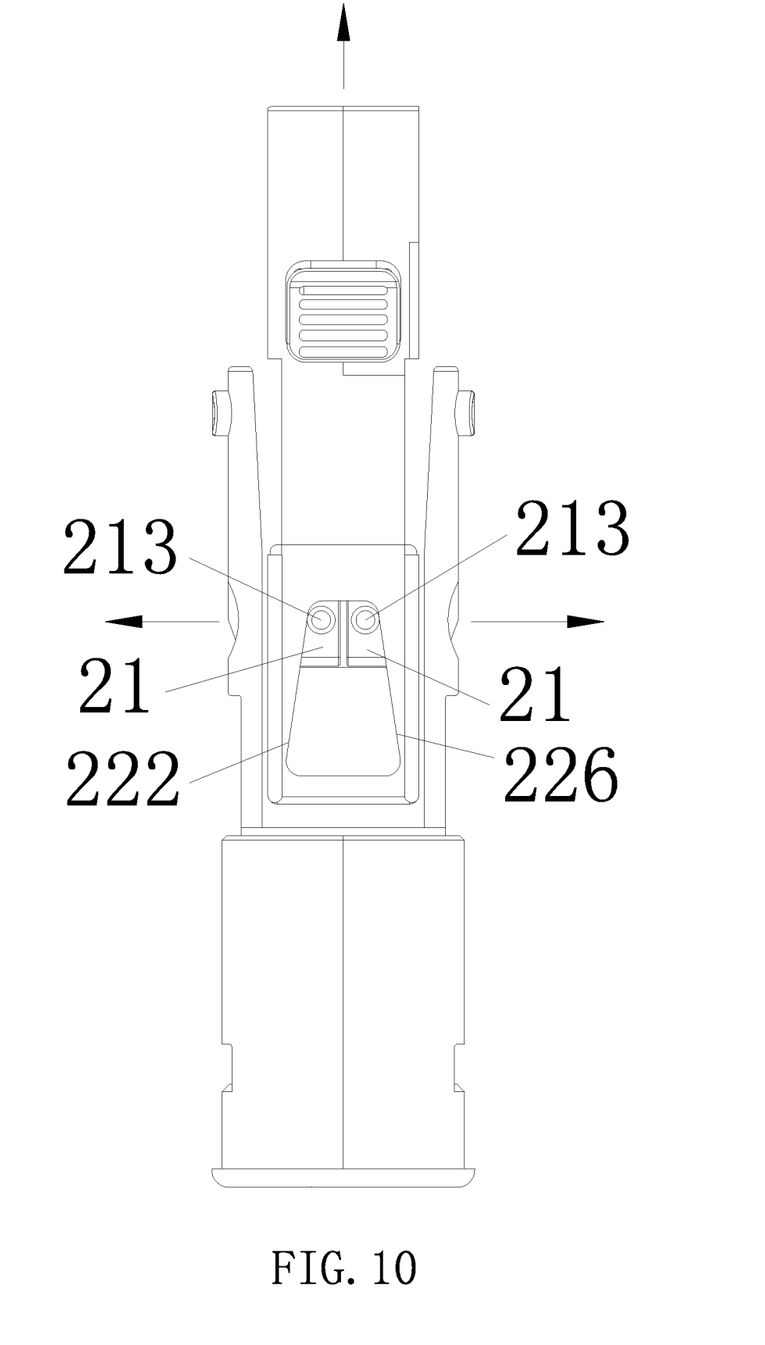
FIG. 10 is a second schematic view of the locking portion of the locking device in an extended state.
Figure 11:
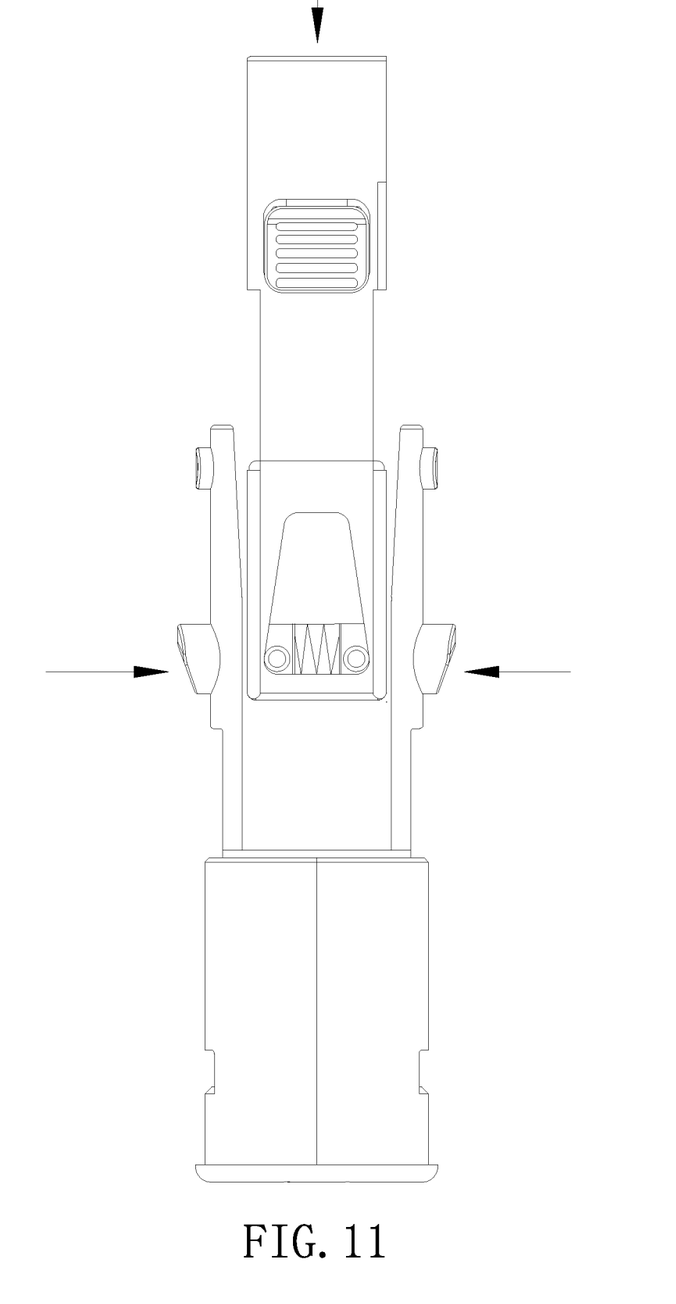
FIG. 11 is a second schematic view of the locking portion of the locking device in a retracted state.
Figure 12:
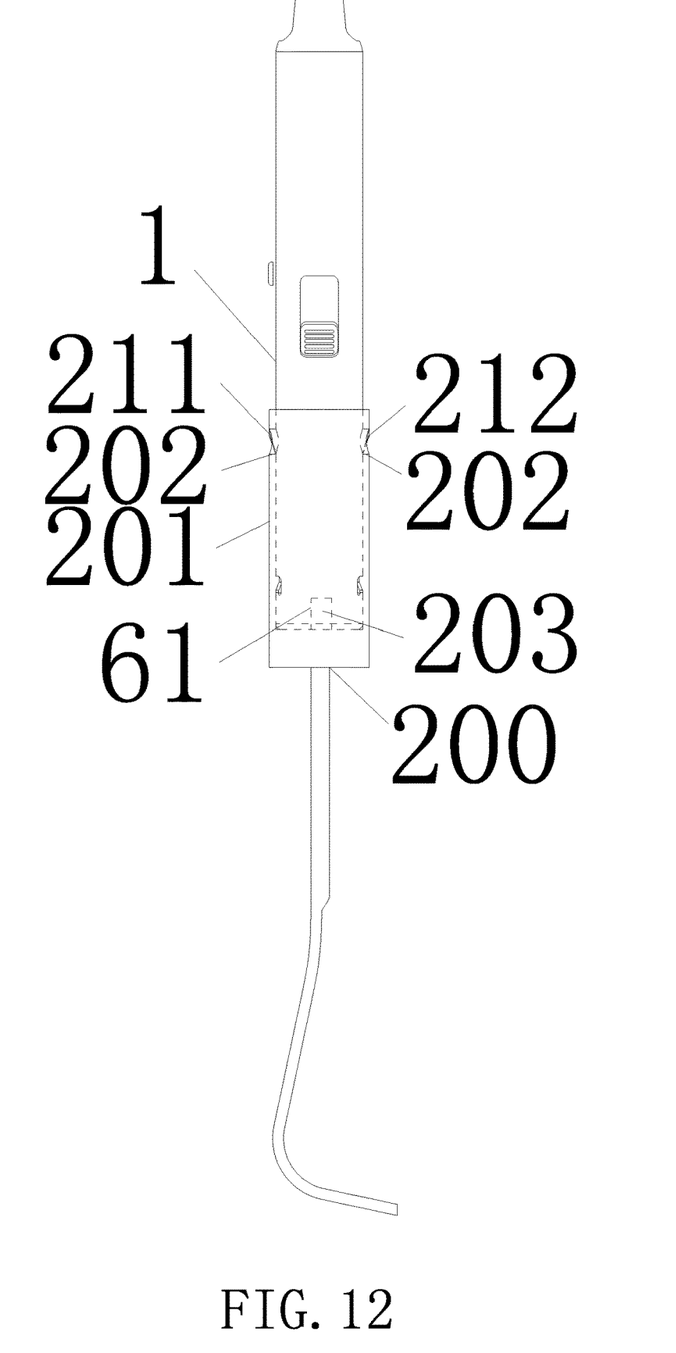
FIG. 12 is a schematic structural view of a work tool mounted.

Further, an end surface of the first locking portion 211 of the first retaining member 21 and an end surface of the second locking portion of the second retaining member 26 are inclined surfaces or circular arc surfaces; after a sleeve body 201 of a work tool 200 is sleeved on the handle body 1, it is convenient to press the locking portion 211 through the inclined surface or the circular arc surface, so that the retaining member is retracted and the sleeve body 201 is completely sleeved on the handle body 1; and a locking hole 202 corresponds to the locking portion 211, and the locking portion 211 extends out to be inserted into the locking hole 202 for fixedly mounting the work tool 200.

In this embodiment, the locking device 2 further includes a second spring 23, both ends of which are respectively connected with the fixed member 25 and the movable member 22. This structural arrangement allows that, after the retaining member is driven to retreat to allow the movable member to move up or down, the force for driving the movable member to translate is canceled, and then the movable member is automatically reset under the action of the second spring, so that the force for driving the retaining member to retreat disappears, and hence the retaining member automatically penetrates through the perforation and the through hole under the action of the first spring.

This structural arrangement the first retaining member 21 and the second retaing member allows the sleeve body to be fixedly mounted in a more stable and reliable manner, thus improving the effect of agricultural or gardening work and providing gardening work or agricultural implements with better service performance.

When the first retaining member 21 and the second retaining member 26 are provided, the second mating body 221 and the third mating body 226 are further provided. This arrangement allows that the two retaining members can be simultaneously manipulated to move forward and backward by the translation of the movable member.

In this embodiment, the fixed member 25 is provided with a second sliding track 250, the second mating body 221 and the third mating body 225 are placed in the second sliding track 250, and outer walls of the second mating body 221 and the third mating body 225 tightly fit an inner wall of the second sliding track 250. This structural arrangement allows that the second mating body slides in a limiting manner in the second sliding track to achieve a smooth, stable and reliable movable member, thus improving the service performance of the handheld implement and providing a more compact structure.

In this embodiment, a positioning slot 61 is arranged at an end of the handle body 1 and hence a positioning block 203 is also arranged on the sleeve body of the work tool; therefore, after the sleeve body of the work tool is sleeved on the handle body, the positioning block on the sleeve body is correspondingly embedded into the positioning slot, so that the work tool does not shake, and the work tool is more stable after being mounted.

In another embodiment, the handheld implement with a replaceable work tool further includes a positioning sleeve 6 fixedly inserted into a port of the handle body 1, and the positioning slot 61 is arranged on an inner wall of the positioning sleeve 6, which is another structural arrangement of the positioning slot, so its function is also the same, i.e. after the sleeve body of the work tool is sleeved on the handle body, the positioning block 203 on the sleeve body is correspondingly embedded into the positioning slot 61, so that the work tool does not shake, and the work tool is more stable after being mounted; and a retaining slot is arranged on an outer wall of the positioning sleeve, a lug is arranged on an inner wall of the port of the handle body, and the lug is correspondingly inserted into the retaining slot to enable fixed insertion of the positioning sleeve.

In this embodiment, the fixed member 25 includes a first spliced body 251 and a second spliced body 252 that are symmetrically spliced with each other, the first spliced body 251 includes a first end plate 2511 which is provided with a first socket 2515 and a first spliced slot 2517, the second spliced body 252 includes a second end plate 2521 and a second spliced slot, the second end plate 2521 is provided with a second socket, each of the first spliced body 251 and the second spliced body 252 is provided with an elongated through hole 200 and two through slots 300 communicated with the elongated through hole 200, the two elongated through holes 200 are correspondingly spliced to form the first sliding track 253, the first through slot 300 of the first spliced body 251 and the first through slot 300 of the second spliced body 252 are spliced with each other to form the first perforation 254, the second through slot 300 of the first spliced body 251 and the second through slot 300 of the second spliced body 252 are spliced with each other to form the second perforation 255, and each of the first spliced body 251 and the second spliced body 252 is provided with the second sliding track 250, wherein one end of the first spliced body 251 is correspondingly inserted into the second socket, one end of the second spliced body 252 is correspondingly inserted into the first socket 2515, a lower end portion 2514 of the first end plate 2521 is correspondingly inserted into the second spliced slot and a lower end portion of the second end plate 2521 is correspondingly inserted into the first spliced slot 2517, so that the first spliced body and the second spliced body are mutually positioned and ultrasonically welded after being spliced; fixing blocks 100 that tightly fit each other are arranged on top surfaces of the first spliced body 251 and the second spliced body 252, and the two fixing blocks 100 are provided with fixing holes 101 positionally corresponding to each other, so that a lower end of the second spring 23 penetrates through the two fixing holes 101 to be fixedly hooked on the fixing blocks 100; and a positioning hole 224 is arranged at a top end of the movable member 22, so that an upper end of the second spring 23 penetrates through the positioning hole 224 to be fixedly hooked at the top end of the movable member 22. This structural arrangement of the fixed member allows that the retaining member can be smoothly placed into the first sliding track for sliding movement, so that the structural design is reasonable, and the product is easy to assemble during production.

In this embodiment, the movable member 22 of the locking device 2 is provided with a knob 3, a first elongated hole 11, a first through hole 13 and a second through hole are arranged on an inner wall of the inner cavity 14, the knob 3 penetrates through and extends out of the first elongated hole 11, the first locking portion 211 of the first retaining member 21 penetrates through the first perforation 254 and the first through hole 13, and the second locking portion 212 of the second retaining member 26 penetrates through the second perforation 255 and the second through hole.

The arrangement of the knob facilitates a user to perform manual operation. Moreover, in order to enhance the comfort of handheld operation, a shell sleeve 4 is fixedly sleeved on the handle body 1, and provided with a second elongated hole 41 positionally corresponding to the first elongated hole 11, and the knob extends out of the second elongated hole 41 for the user to perform handheld operation.

In this embodiment, a first limiting body 223 is arranged at bottom end of the second mating body 221 that is located at the first mating portion 222, and a second limiting body 227 is arranged at the bottom end of the third mating body 225 that is located at the second mating portion 226, wherein the two limiting bodies can be butted with each other to form an integral structure, so that the movable member 22, the second mating bodies 221 and the limiting bodies 223 are combined into an integral structure.

The invention is not limited to the above most preferred embodiment, and various other forms of products can be obtained by any person under the inspiration of the invention. However, regardless of any change to its shape or structure, any technical solution which is the same as or similar to the present application shall fall into the protection scope of the invention.

The invention claimed is:

1. A handheld implement with a replaceable work tool, including a handle body which is equipped with a locking device for detachably mounting the work tool;

the locking device including a movable member, a first retaining member, a second retaining member, a first spring and a fixed member fixed on the handle body, two ends of the first spring respectively abutting against the first retaining member and the second retaining member so that the two retaining members are inserted into a locking hole of the work tool while remaining in an extended state, the fixed member being provided with a first sliding track, the first retaining member and the second retaining member being placed in the first sliding track, an end of the first sliding track being closed to form a first closed end and a second closed end, a first perforation being arranged at the first closed end of the first sliding track, a second perforation being arranged at a second closed end of a second sliding track, the first retaining member further including a first locking portion and the second retaining member further including a second locking portion; the first retaining member and the second retaining member both including a first mating body, the movable member including a second mating body and a third mating body, the second mating body including a first mating portion, the third mating body including a second mating portion, and the first mating portion and the second mating portion including inclined surfaces or circular arc surfaces; and the movable member moving upward or downward during translational movement, the first mating portion and the first mating body of the first retaining member cooperating with each other to make the first retaining member move, the second mating portion and the first mating body of the second retaining member cooperating with each other to make the second retaining member move, the movable member moving upward during translational movement so that the first mating body of the first retaining member and the first mating body of the second retaining member are driven to displace under the action of the inclined surface of the second mating body and the inclined surface of the third mating body so as to pull the first retaining member and the second retaining member to retreat and drive the first locking portion of the first retaining member and the second locking portion of the second retaining member to retreat to withdraw from the locking hole of the work tool; and the handle body being provided with an inner cavity in which the locking device is positioned, the movable member of the locking device being provided with a knob, a first elongated hole, a first through hole and a second through hole being arranged on an inner wall of the inner cavity, the knob penetrating through and extending out of the first elongated hole, the movable member moving downward so that the first mating body of the first retaining member and the first mating body of the second retaining member move outward along the inclined surface under the action of the first spring, and the first locking portion of the first retaining member penetrating through the first perforation and the first through hole, while the second locking portion of the second retaining member penetrating through the second perforation and the second through hole.

2. The handheld implement with a replaceable work tool according to claim 1, wherein the locking device further includes a second spring, both ends of which are respectively connected with the fixed member and the movable member.

3. The handheld implement with a replaceable work tool according to claim 1, wherein the fixed member is provided with a second sliding track, the second mating body and the third mating body are placed in the second sliding track, and an outer wall of the second mating body and the third mating body tightly fit an inner wall of the second sliding track.

4. The handheld implement with a replaceable work tool according to claim 1, wherein a positioning slot is arranged at an end of the handle body.

5. The handheld implement with a replaceable work tool according to claim 4, further including a positioning sleeve fixedly inserted into a port of the handle body, and the positioning slot being arranged on an inner wall of the positioning sleeve.

6. The handheld implement with a replaceable work tool according to claim 1, wherein the fixed member includes a first spliced body and a second spliced body which are each provided with an elongated through hole and two through slots communicated with the elongated through hole, the two elongated through holes are correspondingly spliced to form the first sliding track, a first through slot of the first spliced body and a first through slot of the second spliced body are spliced with each other to form the first perforation, and a second through slot of the first spliced body and a second through slot of the second spliced body are spliced together to form the second perforation, and each of the first spliced body and the second spliced body is provided with a second sliding track.

7. The handheld implement with a replaceable work tool according to claim 1, wherein a shell sleeve is sleeved on the handle body, and provided with a second elongated hole positionally corresponding to the first elongated hole.

8. The handheld implement with a replaceable work tool according to claim 1, wherein both an end surface of the first locking portion of the first retaining member and an end surface of the second locking portion of the second retaining member are an inclined surface or a circular arc surface.

9. The handheld implement with a replaceable work tool according to claim 1, wherein a first limiting body is arranged at a bottom end of the second mating body that is located at the first mating portion, and a second limiting body is arranged at a bottom end of the third mating body that is located at the second mating portion.

10. The handheld implement with a replaceable work tool according to claim 2, wherein a first limiting body is arranged at a bottom end of the second mating body that is located at the first mating portion, and a second limiting body is arranged at a bottom end of the third mating body that is located at the second mating portion.

* * * * *